(12) United States Patent
Köhler et al.

(10) Patent No.: US 7,265,991 B2
(45) Date of Patent: Sep. 4, 2007

(54) HOUSING CAGE FOR HOLDING BUILT-IN MODULES

(75) Inventors: Friedrich Köhler, Meitingen (DE); Mario Bez, Augsburg (DE); August Scherer, Dinkelscherben (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 11/339,279

(22) Filed: Jan. 25, 2006

(65) Prior Publication Data

US 2006/0191698 A1 Aug. 31, 2006

(30) Foreign Application Priority Data

Jan. 28, 2005 (DE) .................. 10 2005 004 104

(51) Int. Cl.
*H05K 5/00* (2006.01)
(52) U.S. Cl. .................. 361/752; 361/679; 361/686; 361/736; 174/63; 174/533; 174/541; 174/556
(58) Field of Classification Search .............. 361/600, 361/679–686, 724–735, 748–752; 174/50, 174/61, 63, 520–533, 541, 551–556
See application file for complete search history.

(56) References Cited

U.S. PATENT DOCUMENTS

| 3,698,590 | A | * | 10/1972 | Cookson | 220/270 |
|---|---|---|---|---|---|
| 5,058,269 | A | * | 10/1991 | May | 29/897.35 |
| 5,124,886 | A | * | 6/1992 | Golobay | 361/727 |
| 5,706,955 | A | * | 1/1998 | Andersson | 211/40 |
| 5,768,099 | A | * | 6/1998 | Radloff et al. | 361/685 |
| 5,828,547 | A | * | 10/1998 | Francovich et al. | 361/685 |
| 6,292,359 | B1 | | 9/2001 | Boe | |
| 6,297,952 | B1 | * | 10/2001 | Liu et al. | 361/685 |
| 6,341,059 | B1 | * | 1/2002 | Kohler et al. | 361/685 |
| 6,473,313 | B1 | | 10/2002 | Chen et al. | |

(Continued)

FOREIGN PATENT DOCUMENTS

DE 195 29 671 A1 2/1996

(Continued)

OTHER PUBLICATIONS

Search Report dated Jun. 12, 2006 for the corresponding European Application No. EP 06 00 0091.

*Primary Examiner*—Dean A. Reichard
*Assistant Examiner*—Xiaoliang Chen
(74) *Attorney, Agent, or Firm*—Cohen Pontani Lieberman & Pavane LLP

(57) ABSTRACT

A housing cage (1) comprising walls (2) defining sides of the housing cage and having wall sections (3). A plurality of contact surfaces (4), each of which is connected to one of said wall sections, are arranged so as to support built-in modules which are held in the housing cage (1). Each of the wall sections (3) is connected only on one first side (5) to its associated wall (2) of the housing cage (1), and the other sides of the wall sections (3) are spaced from the associated wall (2) of the housing cage (1) by incisions (6) in said associated wall, so that each of the wall sections (3) can be bent along the first side (5) with respect to its associated wall (2) of the housing cage (1).

4 Claims, 2 Drawing Sheets

U.S. PATENT DOCUMENTS

| | | |
|---|---|---|
| 6,580,604 B1 | 6/2003 | McAnally et al. |
| 6,590,848 B1 | 7/2003 | Chen |
| 2002/0080573 A1 | 6/2002 | Sheng-Hsiung et al. |
| 2003/0035271 A1* | 2/2003 | Lelong et al. ............... 361/724 |
| 2003/0202322 A1* | 10/2003 | Chen .......................... 361/685 |
| 2004/0037049 A1* | 2/2004 | Erickson et al. ............ 361/726 |
| 2004/0075978 A1* | 4/2004 | Chen et al. .................. 361/685 |
| 2006/0158070 A1* | 7/2006 | Woods et al. ............ 312/223.2 |
| 2006/0191698 A1* | 8/2006 | Kohler et al. .................. 174/50 |

FOREIGN PATENT DOCUMENTS

DE          198 34 463 C2     2/2000

* cited by examiner

HOUSING CAGE FOR HOLDING BUILT-IN MODULES

RELATED APPLICATION

This patent application claims the priority of German patent application 10 2005 004 104.3 filed Jan. 28, 2005, the disclosure content of which is hereby incorporated by reference.

FIELD OF THE INVENTION

The invention relates to a housing cage having wall sections and having contact surfaces which connect them at an angle in order to support built-in modules which are held in the housing cage.

BACKGROUND OF THE INVENTION

Housing cages for holding built-in modules are widely known and are used, for example, for holding drive modules in a drive cage in a computer housing. Because of the wide range of appliances to be accommodated, at least one of the dimensions of the modules to be accommodated is in this case often undefined. For example, 5¼" drive modules exist of the full standard height and of half the standard height, for accommodation in housing cages. In this case, built-in modules of half the standard height are more frequently used than built-in modules of the full standard height, for which reason the associated housing cages are typically designed with contact surfaces for holding built-in modules of half the standard height.

In order nevertheless to allow built-in modules of the full standard height to be accommodated in a housing cage such as this, it must be possible to remove at least some of the contact surfaces of the housing cage from its interior. This is typically achieved by at least some of the contact surfaces being in the form of an accessory which is screwed into the housing cage later. When modules of the full standard height are installed, contact surfaces such as these which prevent the accommodation of the built-in module are removed from the housing cage again by undoing the screw connection. The belated installation and possible removal of such additional contact surfaces is in this case expensive and time-consuming. The completely assembled housing no longer comprises only the housing cage itself, but also the additionally required contact surfaces.

Alternatively, rails can also be used for holding built-in modules. In this case, the rails are installed in the housing cage only when the built-in module is being fitted. This solution is also relatively complex and requires the rails as a relatively expensive accessory to hold built-in modules.

The effort incurred by the fitting of built-in modules of different standard height during the production of the housing, together with the fitting of built-in modules as well as the costs for the required accessories are not justified by the rarely required function of holding built-in modules of the full standard height.

SUMMARY OF THE INVENTION

One object of the present invention is to provide a housing cage which allows built-in modules of different standard height to be accommodated without any need to remove additional contact surfaces from the housing cage, or to fit rails in the housing cage.

This and other objects are attained in accordance with one aspect of the present invention directed to a housing cage comprising walls defining sides of the housing cage and having wall sections. A plurality of contact surfaces, each of which is connected to one of said wall sections, are arranged so as to support built-in modules which are held in the housing cage. Each of the wall sections is connected only on one first side to its associated wall of the housing cage, and the other sides of the wall sections are spaced from the associated wall of the housing cage by incisions in the associated wall, so that each of the wall sections can be bent along the first side with respect to its associated wall of the housing cage.

In the basic state, the contact surfaces are arranged in the housing cage such that it is possible to fit built-in modules of half the standard height. In this case, the invention makes use of the fact that the wall sections with the contact surfaces connected to them can be bent out of the inner area of the housing cage by virtue of the incisions according to the invention, thus making it possible to fit built-in modules of the full standard height. For this purpose, the wall section which can be bent is connected to the wall of the housing cage only on a single side, while incisions between the other sides of the wall section and the wall of the housing cage allow the wall section to be bent out from the housing wall along the first side. The incisions in the wall of the housing cage which are required for bending may be incorporated in the housing wall even during the production process.

In this case, the connection of the wall section to the contact surface can be designed to be very robust, thus leading to good mechanical characteristics in the direction of the weight force that is caused by a built-in module that has been fitted. At the same time, the connection of the first side of the wall section to the wall of the housing cage can be designed such that the wall section with the contact surface connected to it can easily be bent out of the wall of the housing cage. This is because no force acts on that wall section in this direction during normal operation, that is to say in the installed state.

The connection between the wall of the housing cage and the wall section which can be bent is advantageously prepared during the production process of the housing itself, such that the wall section can easily be bent with respect to the wall of the housing cage along the first side of the wall section. By way of example, a stamped-in depression can be provided for this purpose between the wall of the housing cage and the first side of the wall section. It is likewise possible to connect the wall section to the wall of the housing cage only on a subsection of the first side.

DETAILED DESCRIPTION OF THE DRAWINGS

Figure 1:
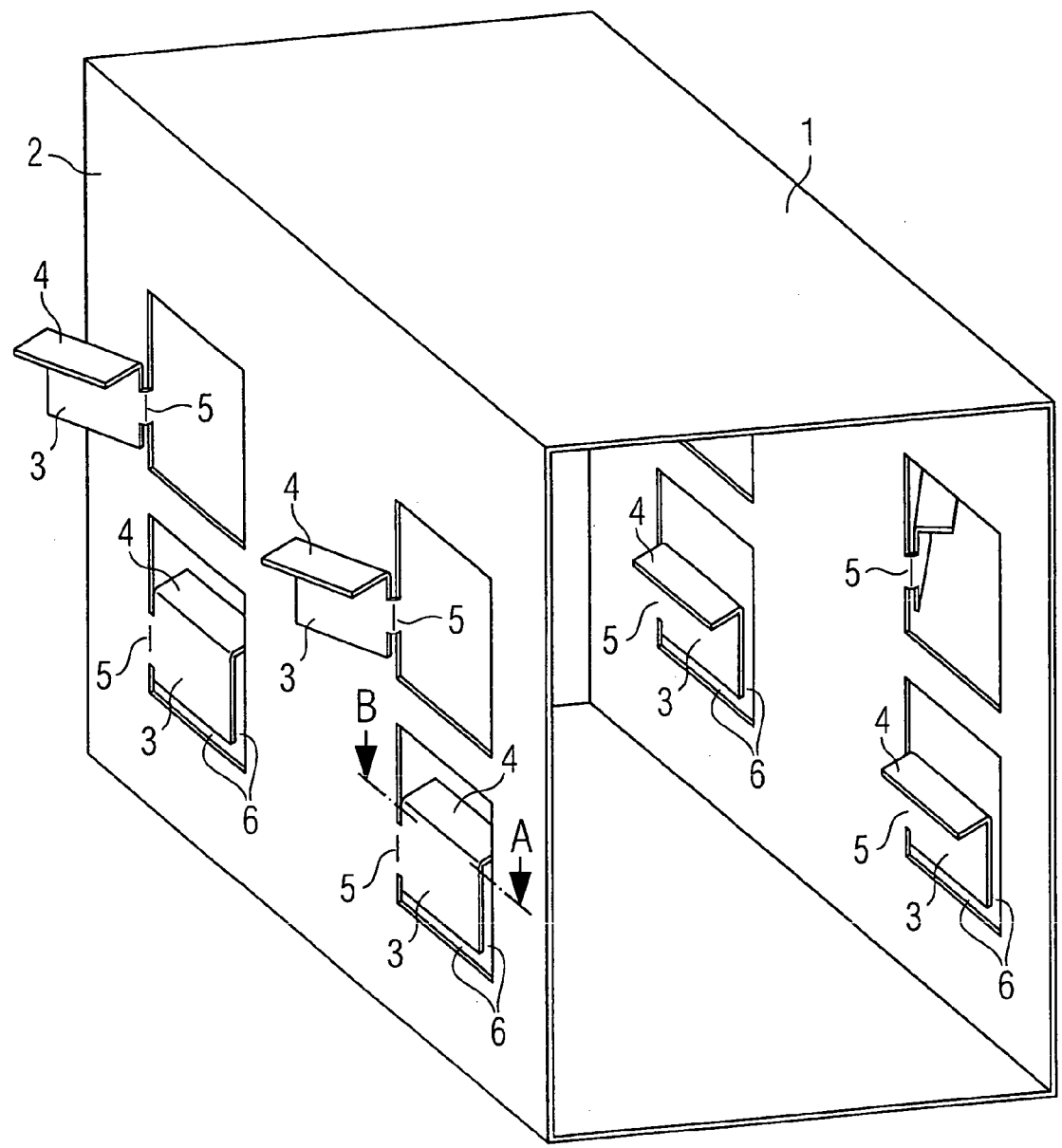
FIG. 1 shows a housing cage according to an embodiment of the invention with wall sections which can be bent.

FIG. 1 shows a housing cage 1 with walls 2 which each have four wall sections 3 that can be bent. The wall sections 3 that can be bent are connected to contact surfaces 4 at an angle. Furthermore, the wall sections 3 that can be bent are connected on a first side 5 to one of the walls 2 of the housing cage 1. Incisions 6 are provided between the other sides of the wall sections 3 and the wall 2 of the housing cage 1.

Figure 2:
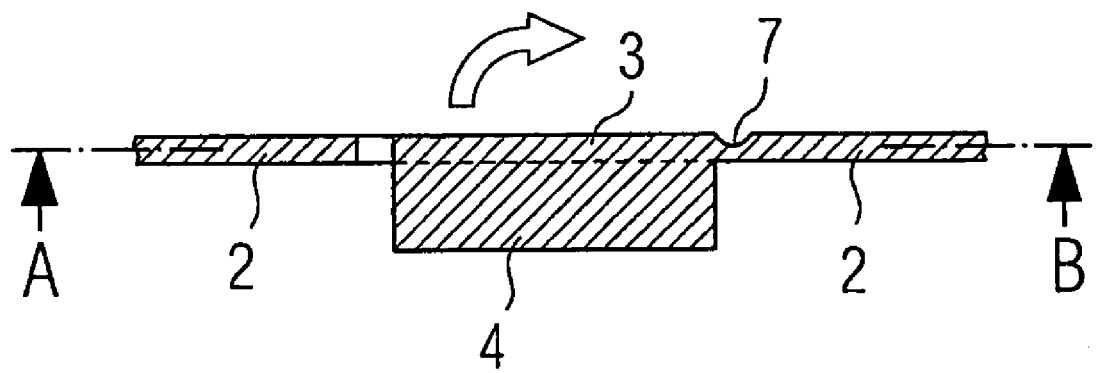
FIG. 2 shows a plan view of a first embodiment of a wall section which can be bent.

FIG. 2 shows a detailed plan view along the section A-B of a first embodiment of the wall section 3. An indentation, or depression, 7 is formed between wall 2 of the housing cage 1 and the wall section 3 together with the contact surface 4 that is connected to it. The indentation 7 weakens that part of housing cage 1 so that it can be bent, as explained below. If it is intended to fit the housing cage 1 with a built-in module which requires the removal of the contact surfaces 4 from the interior of the housing cage 1, then the wall section 3 and the contact surface 4 which is connected to it are bent out of the interior of the housing cage 1 in the direction of the arrow in FIG. 2. The stamped-in depression 7 allows the wall section 3 to be bent relatively easily in the direction of the arrow.

Figure 3:
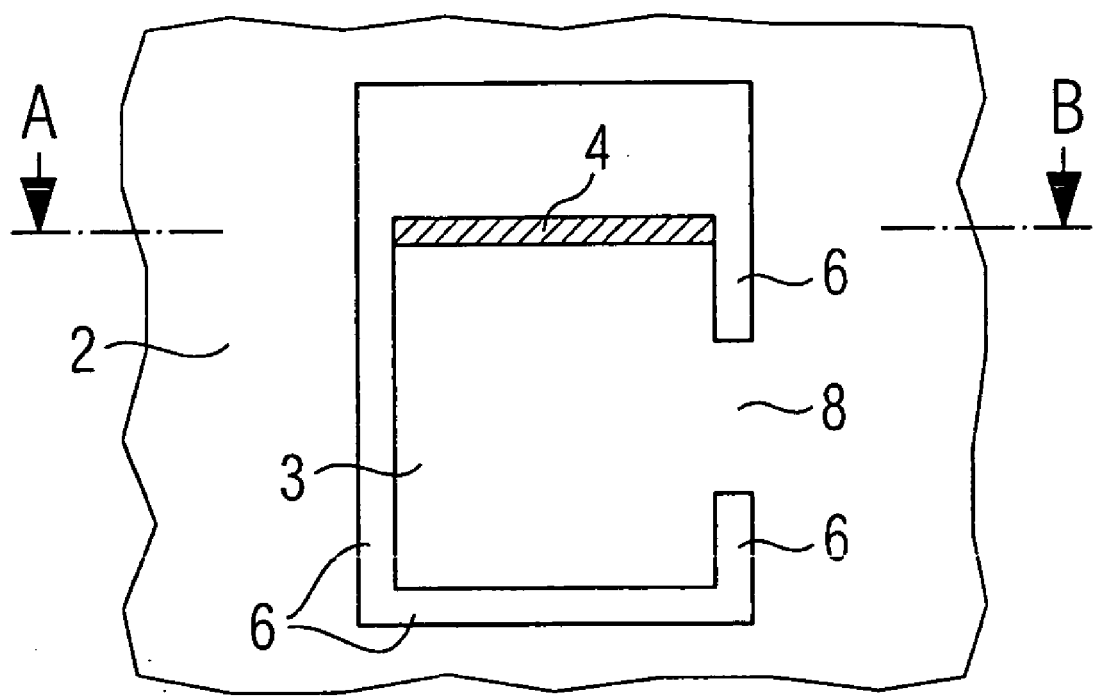
FIG. 3 shows a side view of a second embodiment of a wall section which can be bent.

FIG. 3 shows a second embodiment of the invention in which the wall section 3 and the contact surface that is connected to it are connected to the wall 2 of the housing cage 1 only on a subsection 8 of the first side 5. Other subsections of the first side 5 and the other sides of the wall section 3 are separated from the wall 2 by incisions 6. The wall section 3 together with the contact surface 4 that is connected to it can be bent out in an analogous manner to that in the first exemplary embodiment.

In both exemplary embodiments, a flap which is bent at right angles to the wall section 3 acts as a contact surface 4 for installation of built-in modules. In this case, it is advantageous for a holding force which occurs as a result of a built-in module being fitted to act at right angles to the contact surface 4, and thus to act parallel to the bending axis of the first side 5 of the wall section 3. Built-in modules thus exert no force on the wall section 3 which would lead to the wall section 3 being accidentally bent out of the wall 2 of the housing cage 1. In consequence, the housing cage according to the invention with the contact surfaces that are connected to it has the robustness required for holding the built-in modules, while the contact surfaces can nevertheless be bent out easily with the aid of a suitable tool.

However, alternative embodiments of the housing cage 1 according to the invention are possible, in which the first side 5 of a wall section 3 also runs in other directions. By way of example, the first side 5 could be formed by one of the oblique sides of a triangle underneath or above a contact surface 4, that is to say running obliquely. In this case, the contact surface 4 would be connected to a horizontal side of the triangle, and the last side of the triangle would, according to the invention, be separated from the wall 2 of the housing cage 1 by an incision 6. In the same way, the first side 5 may run parallel to the contact surface 4, that is to say horizontal. This is because, in this arrangement as well, the weight force that is caused by a fitted built-in module does not act in the same direction as the force which is required to bend out the wall section 3.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. A housing cage comprising:
   walls defining sides of the housing cage and having wall sections; and
   a plurality of contact surfaces, each of which forms a horizontal flap connected to a horizontal side of one of said wall sections, said flaps extending out of the wall sections and being configured to support built-in modules which are held in the housing cage;
   wherein each of the wall sections is connected only on one first side to its associated wall of the housing cage, and the other sides of the wall sections are spaced from an associated wall of the housing cage by incisions in said associated wall, so that each of the wall sections can be bent along the first side with respect to its associated wall of the housing cage.

2. The housing cage as claimed in claim 1, wherein the housing cage has a stamped-in depression between the wall of the housing cage and the first side of the wall section, along which the wall section can be bent.

3. The housing cage as claimed in claim 1, wherein the wall section is connected to the wall of the housing cage only on a subsection of the first side, and other sections of the first side are separated by incisions from the wall of the housing cage.

4. The housing cage as claimed in claim 1, wherein the housing cage is a drive cage, and the built-in modules are 5¼" drives of half the standard height or the full standard height.

* * * * *